United States Patent

[11] 3,579,260

[72] Inventor Lewis J. Logan
11820 Edgewater Drive, Lakewood, Ohio 44107
[21] Appl. No. 477,652
[22] Filed July 28, 1965
[45] Patented May 18, 1971
Continuation-in-part of application Ser. No. 223,457, Sept. 13, 1962, now abandoned.

[54] MACHINE FOR WELDING STUDS TO BEAMS
8 Claims, 15 Drawing Figs.

[52] U.S. Cl. .................................................... 219/98
[51] Int. Cl. .................................................... B23k 9/20
[50] Field of Search ....................................... 219/87, 95, 101 (R), 125; 51/178; 219/98, 99, 126

[56] References Cited
UNITED STATES PATENTS 2,781,441  2/1957  Ballentine et al. ............ 219/126
2,960,053  11/1960  Meyer ........................... 219/126X Primary Examiner—R. F. Staubly
Attorney—Woodling, Krost, Granger and Rust ABSTRACT: A welding machine for simultaneously welding a plurality of studs on a beam (particularly an I-beam) comprising a frame with front and rear wheels for engaging the beam. A plurality of welding heads are mounted on a supporting means and each head includes a chuck for holding a stud; means for moving the chuck away from the beam; means for moving the chuck toward the beam; and, means for supplying electric power to the chuck. The heads are mounted for vertical and horizontal adjustment relative to the frame. Guide means are provided between the machine and the beam to properly orient the machine relative thereto and means are provided for raising and lowering said heads and supporting means as a unit relative to the wheels of the machine.

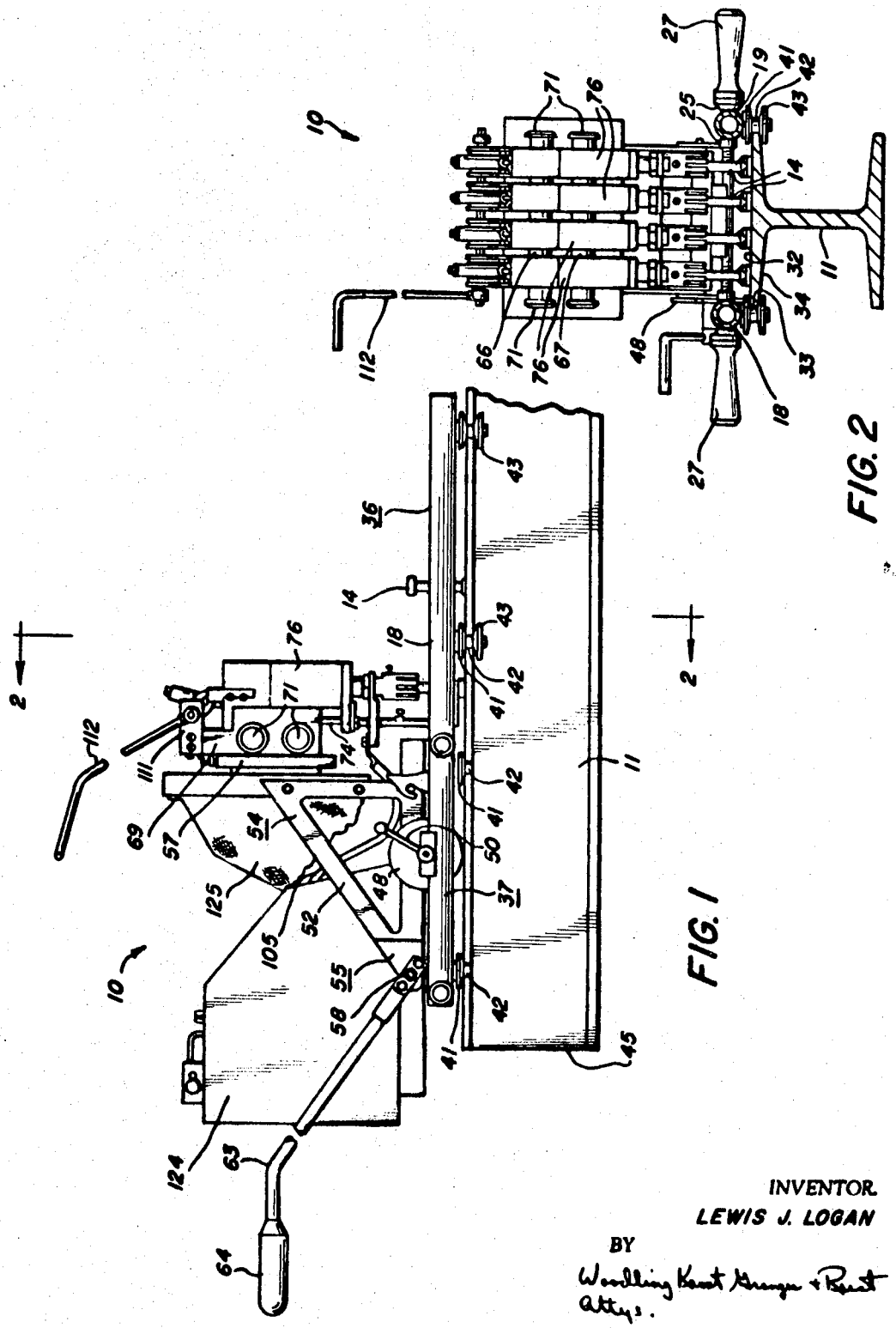

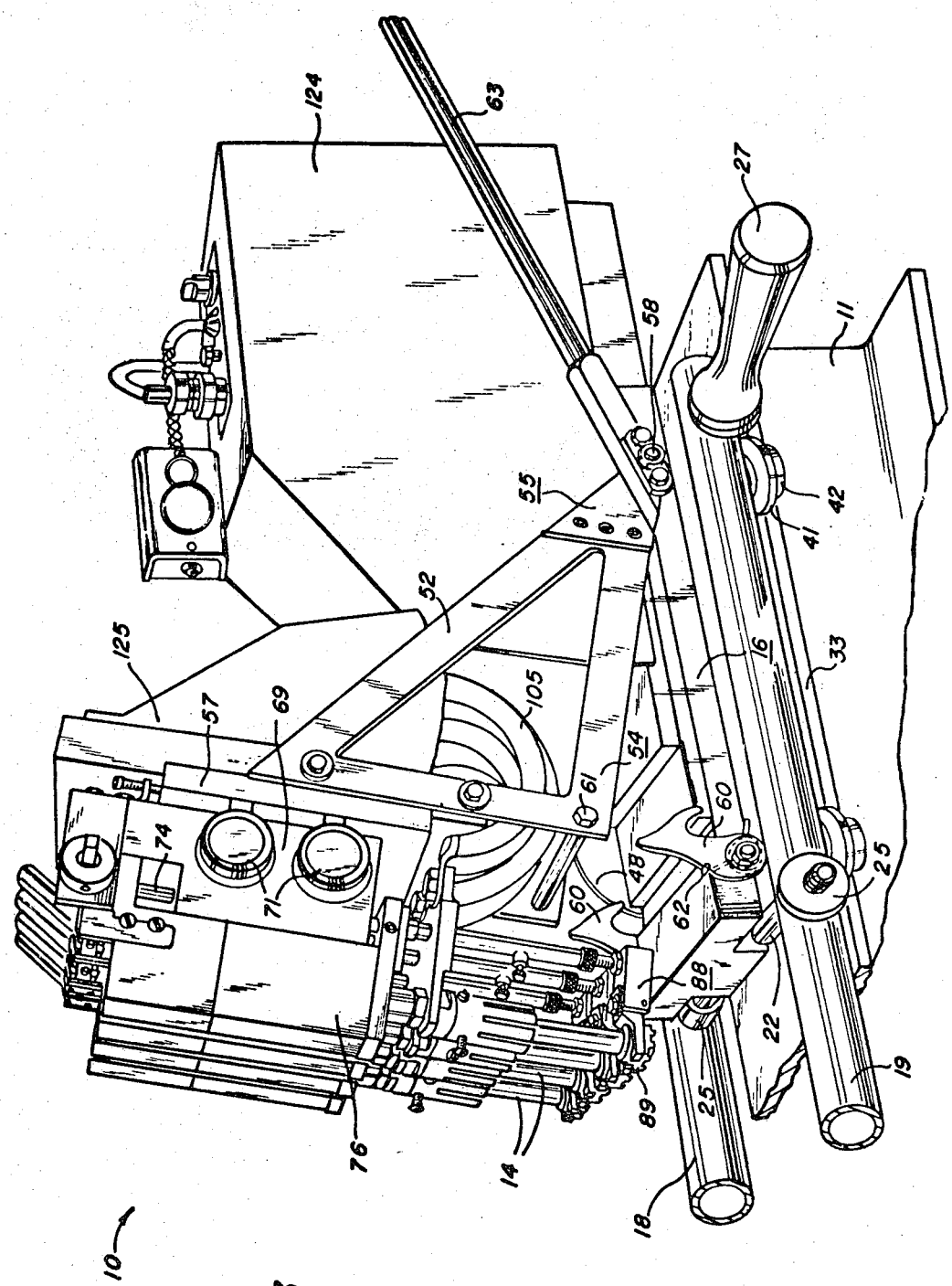

INVENTOR.
LEWIS J. LOGAN

Patented May 18, 1971

INVENTOR.
LEWIS J. LOGAN

INVENTOR.
LEWIS J. LOGAN

INVENTOR.
LEWIS J. LOGAN
BY Woodling Kent Stranger + Kent
Attys.

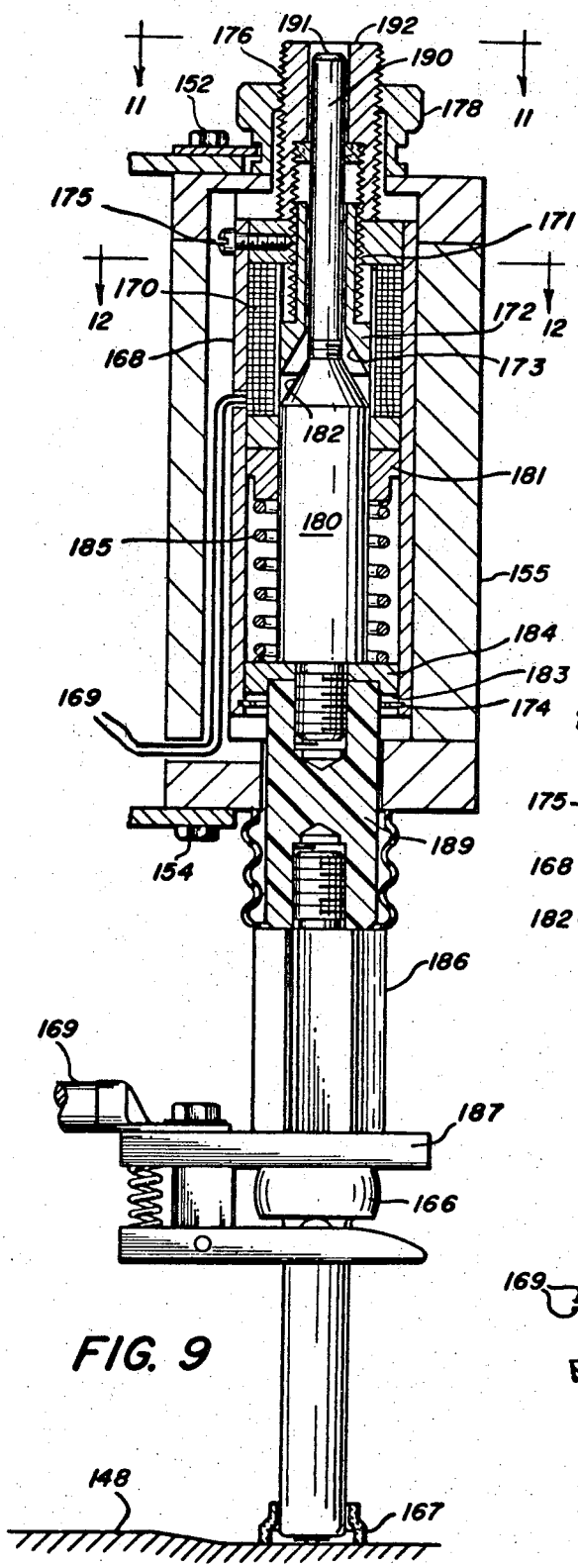
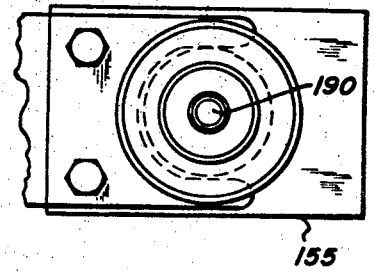
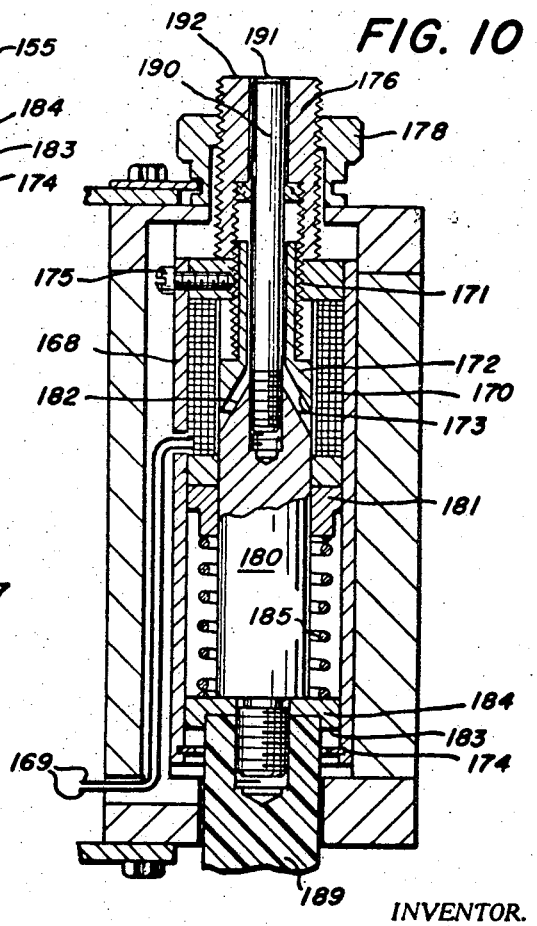
FIG. 9
FIG. 10
FIG. 11
INVENTOR.
LEWIS J. LOGAN

INVENTOR.
LEWIS J. LOGAN

Patented May 18, 1971

INVENTOR.
LEWIS J. LOGAN
BY
Woodling Krost Granger Rust
Attys

MACHINE FOR WELDING STUDS TO BEAMS

The present invention relates in general to a welding machine and more particularly to such a machine which is adapted to welding a plurality of weldable members such as studs to a member such as a metal beam. The present invention also relates to a means for indicating to an operator of the machine whether the "lift" and "plunge" distances of the welding heads are correct and if not, means are provided for making proper adjustments to set these distances correctly.

This application is a continuation-in-part application of U.S. Pat. application Ser. No. 223,457, filed Sept. 13, 1962 now abandoned.

In the welding of stud members (as a matter of example only) to beam members to hold subsequently poured concrete in place, it has become necessary to weld a greater number of studs per unit of time in order to economically justify the use of such construction items. The prior art methods have utilized hand guns which weld one stud at a time as well as other devices, however these have become less and less economical with the advent of higher costs.

It is therefore an object of the present invention to provide a machine or apparatus which is able to weld weldable members at a greater rate than by the use of prior art mechanisms and methods.

Another object of the present invention is to provide a machine for welding a plurality of weldable members to a support member which machine has provision for adapting to surface irregularities of the support member.

Another object of the present invention is to provide a machine for welding a plurality of weldable members abreast to a support member wherein the means for holding the weldable members is movable between first and second vertical positions in a substantially vertical straight line direction.

Another object of the present invention is to provide a machine for welding a plurality of weldable members to a support member which includes a plurality of welding heads for holding the weldable members prior to and during the welding cycle with spring biasing means for urging the heads toward the support member whereby irregularities in the surface of the support member will be compensated for by the spring biasing means.

Another object of the present invention is to provide a machine for welding a plurality of weldable members which includes welding heads which may be moved between a welding and a first loading position and to a second loading position if desired.

Another object of the present invention is to provide a machine for welding members which includes welding heads movable into a welding position and lock means for keeping them in this position until released.

Another object of the present invention is to provide a welding machine with a carriage for transporting the same along a metal beam.

Another object of the present invention is to provide a carriage for a welding machine which enables a large portion of the machine to overlie the end of a beam which in turn permits the welding of welding members up to the extreme end of the beam.

Another object of the present invention is to provide a welding head or gun which includes a coil and a movable armature with an indicating member which extends to the outside of the head to provide a means for indicating the relative position of the armature.

Another object of the present invention is to provide a welding head or gun which includes a coil and an armature movable between limits determined by first and second abutment members and means extending exteriorly of the head to indicate the position of the armature relative to the first and second abutment members and another means extending exteriorly of the head to change the position of the abutment members and armature relative to each other.

Other objects and a fuller understanding of this invention may be had by referring to the following description and claims, taken in conjunction with the accompanying drawings, in which:

FIG. 1 is a side elevational view of the welding machine of the present invention as positioned on an I-beam;

FIG. 2 is a view taken generally along the line 2–2 of FIG. 1;

FIG. 3 is a perspective view of the welding machine shown in FIG. 1 but showing an opposite side thereof;

FIG. 9 is an elevational view of the welding head shown in FIG. 8 but illustrates the relative positions of the parts when a stud carried by the chuck of the welding head is located in a depressed portion of a surface to which it is to be welded;

FIG. 10 is a view similar to FIG. 9 with the stud in the depressed portion but showing the adjustment means of the present invention adjusted so as to provide a satisfactory weld when the welding cycle is initiated;

FIG. 11 is a view taken generally along the line 11–11 of FIG. 9;

Figure 4:
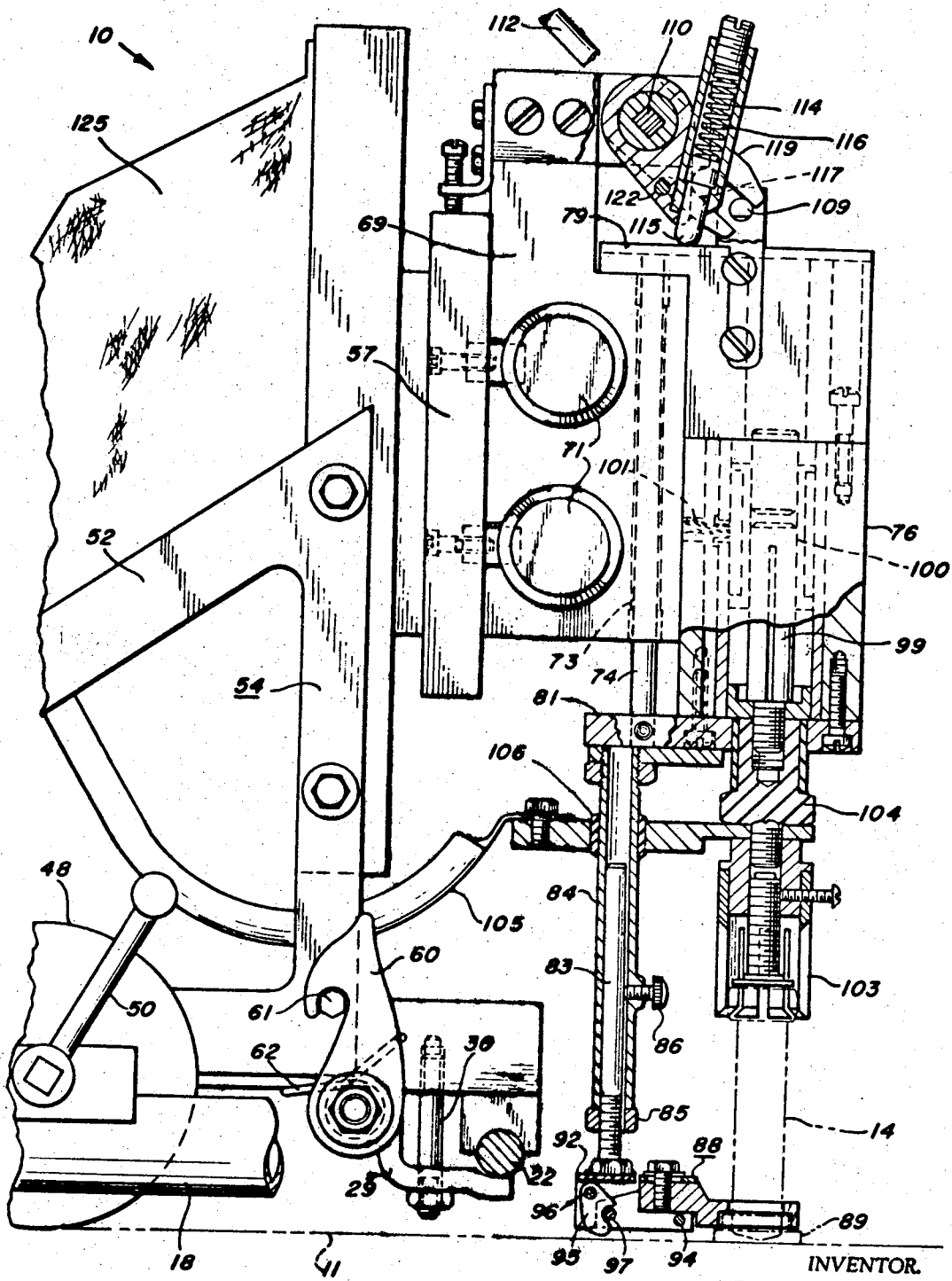
FIG. 4 is an enlarged view of the welding machine with some of the parts thereof in cross section and similar to the view of FIG. 1.

The welding machine is indicated generally by the reference numeral 10 and its environment on an I-beam 11 is best shown in FIGS. 1 and 2 of the drawings. As best seen in FIG. 2, the machine is adapted to weld a plurality of welding studs 14 transversely across the beam 11 and the machine includes in combination a mounting platform 16 (FIG. 3) disposed generally parallel to and spaced slightly above the upper surface of the beam. First and second mounting tubes 18 and 19 respectively are positioned on either side of the platform 16 and extend generally lengthwise of the beam. The mounting tubes 18 and 19 are maintained in a given position with respect to each other by first and second spaced securing rods only the front one 22 being shown, each end of which is threaded and extends through the mounting tubes. Threaded nut or securing members 25 are provided on the threaded ends of the securing rods on both the inside and outside portions of the mounting tubes and serve to rigidly secure the assembly together. Handles 27 may also be provided on the extreme end of the threaded securing rods for the purpose of enabling workmen to transfer the machine, for example from a completed beam to a new beam. The handles 27 have been omitted from the front rod 22 in FIG. 3. The mounting platform 16 is secured to an intermediate portion of each of the securing rods by means of a bracket 29 and screw member 30.

The I-beam 11 has what may be referred to as an upper surface 32, edge surfaces 33 and a lower surface 34 and each of the mounting tubes may also be referred to as side rails and each has a first and second end portion 36 and 37 respectively. It will be noted that the bulk or primary weight or portion of the machine is located over the second end portion 37 of the side rails, whereas little, if any, of the machine is positioned over the first end portion 36. First roller means are located on the first end portion of the side rails and second roller means are located at the second end portion of the side rails. Each of the first and second roller means includes generally vertically disposed pivot means 39 (FIG. 5) secured to the side rails or mounting tubes and a roller is mounted by each of the pivot means 39. All of the rollers are provided with a first large diameter portion 41 which engages the upper surface 32 of the beam and a small diameter portion 42 which engages the edge surfaces 33 of the beam. The rollers at the first end portion 36 of the side rails differ from the other rollers in that they are provided with a second large diameter portion 43 which is engageable with the bottom margin of the upper flange of beam 11 for a purpose which will hereinafter be described. The primary purpose of the type of rollers described is to permit the welding machine to weld studs up to the extreme end of a beam without necessitating manually holding the machine in place while this is done. This will be appreciated from viewing FIG. 1 wherein the machine is moving progressively to the left to weld the transverse rows of studs. The second large diameter portions 43 of the rollers permit the bulk of the machine along with the second end portion of the side rails to overhang the extreme end of the beam 45 while a final row of stud members is being welded at substantially the extreme end 45 of the beam.

The welding machine may be moved manually along the beam by the operators of the machine by means of the handles 27. However, in order to permit a finer adjustment of movement, there is provided a knurled drive wheel 48 which is pivotally connected to the first side rail 18 by means of a pivot member 49 and is adapted to be turned by means of a hand crank 50. It will be noted that the drive wheel is in engagement with the upper surface 32 of the beam and this results in the machine being moved along this upper surface as desired.

Figure 5:
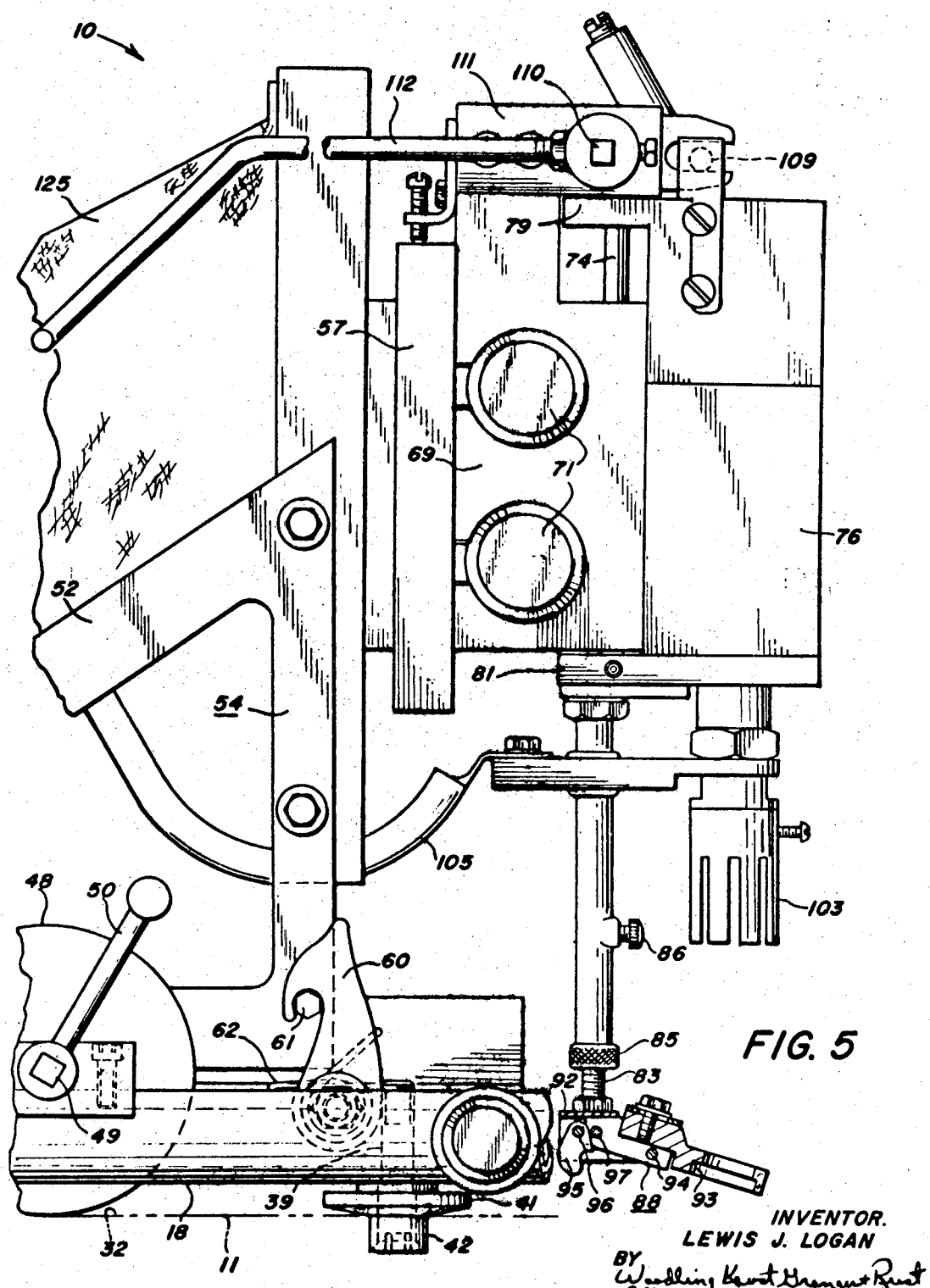
FIG. 5 is a view similar to FIG. 4 but showing the machine in another position.
Figure 6:
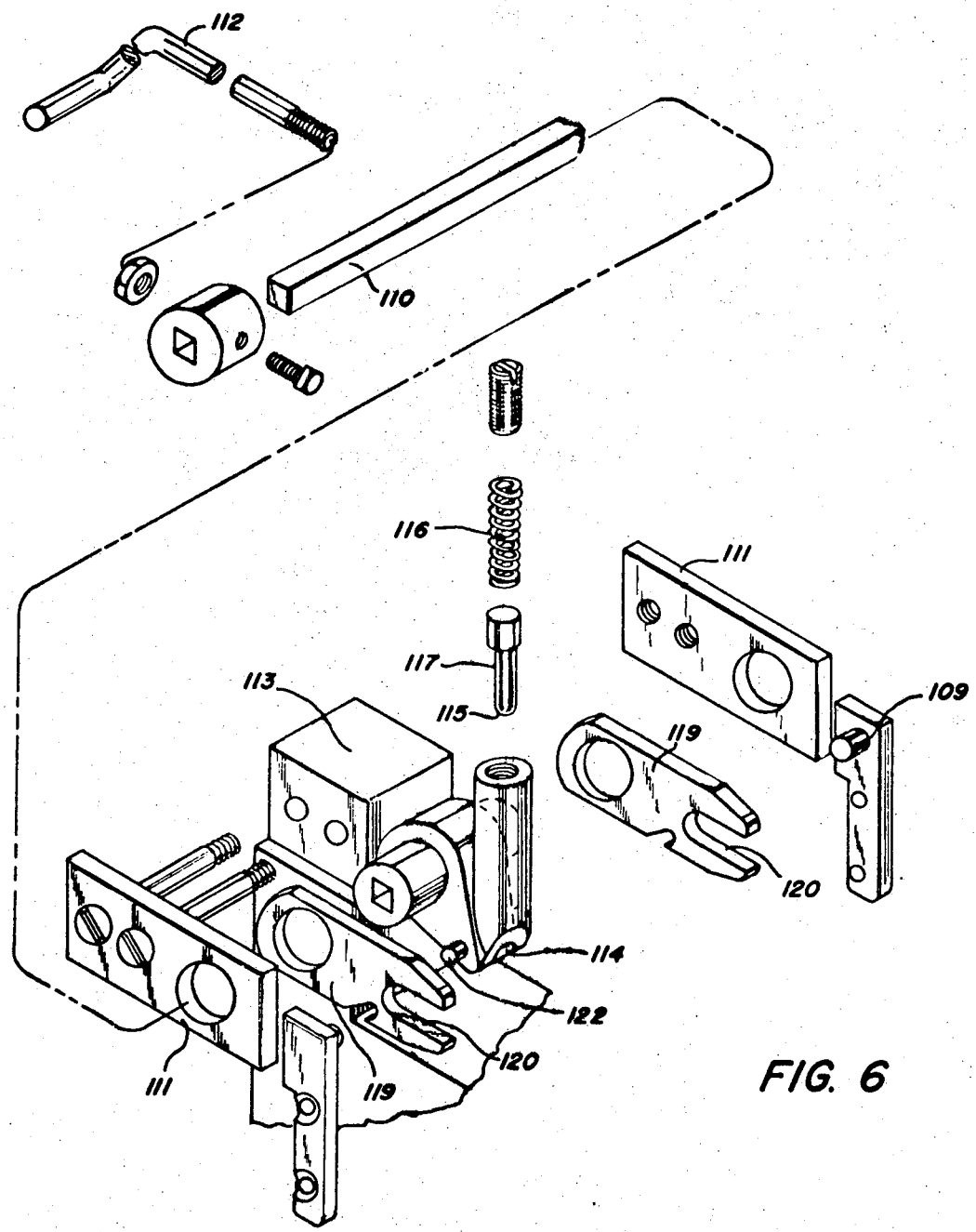
FIG. 6 is an exploded view showing some of the details of the machine.

What may be generally referred to as a frame 52 is provided which has what may be referred to as first and second end portions 54 and 55 respectively. A securing plate assembly 57 is carried by the first end portion of the frame 54 and pivot means 58 serve to pivotally connect the second end portion 55 of the frame to the mounting platform for movement of the frame between first and second positions. The first position of the frame is shown in FIGS. 4 and 5 whereas the second position of the frame is indicated in FIG. 3. Latch members 60 are pivotally carried by the mounting platform 16 and are movable into and out of engagement with a rod 61 on the frame to either maintain the frame in its first position (FIG. 4) or permit it to move to its second position (FIG. 3). Springs 62 bias the latch members 60 to the position shown. Lever arms 63 are rigidly secured to the frame 52 at its second end portion thereof at the general location of the pivot means 58 and the ends of these lever arms 63 are provided with counterweights 64 which aid in maintaining the frame in its second position (FIG. 3).

The securing plate assembly 57 has fixed to the front portion thereof first and second generally cylindrically shaped guides 66 and 67 respectively (FIG. 2), which extend in a generally horizontal direction and are vertically spaced from each other. A plurality of mounting blocks 69, in this case four in number, are each provided with guideways therein which correspond to the guides 66 and 67 and these interfitting parts serve to locate the mounting blocks on the guides. The ends of the guides 66 and 67 are provided with threaded cap members 71 which serve to maintain the mounting blocks on the guides. Each of the mounting blocks is provided with a vertical opening 73 (FIG. 4) through which a guide rod 74 extends. A welding head 76 is connected to each of the mounting blocks 69 and is adapted for movement between first and second positions with the first position being shown in FIG. 4 and the second position shown in FIG. 5. The welding head is secured to the mounting block by means of the guide rods 74 being secured at their upper portions to an upper portion 79 of the welding head 76 and to a lower portion of a respective welding head by means of a plate 81 which is bolted to the main body of the welding head. Each of the welding heads also comprise an extendible leg 83 which fits in a guide tube 84 and the position of the extendible leg is held fixed by means of a nut member 85 and a threaded engagement member 86.

A ferrule chuck 88 is secured to the lower end of each of the extendible legs 83 and is adapted to hold a refractorylike ferrule 89 in position relative to the welding studs 14 during the welding operation. The construction of the ferrules will be appreciated by those skilled in the art and will not be referred to hereinafter. The ferrule chuck includes a fixed portion 92 directly connected to the lower end portion of the legs 83 and a ferrule engaging portion 93 which is pivotally connected to the fixed portion as at 94. A latch 95 is pivoted at 96 to the fixed portion 92 and is adapted to engage and disengage a pin 97 also secured to the fixed portion 92. It will be appreciated that the normal tendency of the ferrule engaging portion 93 would be to tend to pivot about the pivotal connection 94 (to the position of FIG. 5) by the action of gravity in a clockwise direction and with the position of the latch 95 as shown in FIG. 4, this is prevented because of engagement of the latch with pin 97. As the frame 52 is swung to the position shown in FIG. 3 the latch 95 because of its shape and weight permits disengagement of the latch member with the pin 97 and the ferrule engaging portion 93 pivots about the connection 94. It will, thus, be seen, as will be described hereinafter, that ferrules 89 engaged by the ferrule engaging portion 93 are cocked or positioned at an angle with respect to the welding studs 14 with which they cooperate and therefore are held in position relative thereto while the machine is being moved from the position of FIG. 3 to the positions of FIGS. 4 and 5.

Each of the welding heads also includes a movable armature 99 which is surrounded by a coil 100 which in turn is energized by means of conductors 101 from a control circuit which is not shown. In other words, when the coil is energized the armature 99 moves upwardly in a manner well known to those skilled in the art and when the coil is deenergized, the armature moves downwardly in most cases by the urging of a spring not shown in these drawings but this construction will also be readily appreciated by those skilled in the art. A stud chuck 103 is connected to the movable armature 99 by means of insulating member 104 and is adapted to move upwardly and downwardly therewith. Welding current is supplied to the stud chucks 103 by means of electrical conductors 105. An insulated bushing 106 insulates the conductors from the extendible leg 83 and also permits sliding engagement of the stud chuck relative to the extendible leg during the welding operation which will be described hereinafter.

A lifting pin 109 is secured to the upper portion of each of the welding heads 76 and brackets 111 are carried by the mounting blocks and serve to journal a generally square rod 110 for angular movement. A handle 112 is connected to the square rod for moving the same between first and second positions. Each of the welding heads is provided with a variable lowering device and these devices include a variable or operating member 113 having a square opening extending therethrough and interfitting with the square rod 110. This means that angular movement of the rod causes corresponding angular movement of the operating member. The operating member is also provided with a cylindrical guide chamber 114 and an engagement member 117 resides in the chamber 114 and has a portion 115 in engagement with the upper portion 79 of the welding head. A spring 116 is positioned in each of the chambers 114 and exerts a force on the engagement member 117 to urge the same into contact with the welding head which in turn urges the welding head to its first position or in other words that indicated in FIG. 4. Two fork-shaped operating members 119, each having a fork-shaped end 120, are carried by each of the variable members 113 and are capable of being moved angularly with respect thereto. The fork-shaped end 120 of the lifting members 119 surround the lifting pin 109 and upon rotation of the square rod 110 in a counterclockwise direction as seen in FIG. 4 a pin 122 on the variable member 113 engages the fork-shaped lifting member 119 causing lifting of the welding heads to the position shown in FIG. 5. It will be appreciated from viewing FIG. 4 that upward movement of the welding heads is normally resisted since the engagement of the top portion 79 of the welding head with the portion 115 of the engagement member 117 tends to rotate the operating member 113 clockwise which merely serves to more tightly compress the spring 116 within limits. This provision also enables the respective welding heads to accommodate themselves for inaccuracies in the upper surface of the beam or member to which the studs are to be attached, which inaccuracies may be caused by warpage or other reasons.

FIGS. 1 and 3 illustrate a housing 124 carried by the second end portion of the mounting platform and this housing is for the purpose of carrying electrical circuit components not shown which in turn control the welding cycle of the four welding heads shown in the present embodiment. As mentioned before, the conductors 105 transmit welding current to the stud chucks 103 and the conductors 101 serve to supply energizing current to the coils 100. This is done, of course, in a timed sequence which will be described hereinafter. A canvas covering 125 is secured at one end portion to the first end 54 of the frame 52 and extends at another end to the housing 124 to cover the electrical conductors which extend therebetween. This canvas is primarily as a matter of protection for these conductors to protect the same from damaging influences, for example weld berries, which result during the welding operation.

The operation of the machine is essentially as follows. The machine is originally introduced onto an end of the beam as will be appreciated from viewing FIG. 1 and welding studs 14 are introduced into the stud chucks 103 for example while the machine is in the position of FIG. 3. Welding ferrules 89 are located on the lower end portion of the welding studs by means of the ferrule chucks 88 which assume the cocked or angular position shown in FIG. 3 because of the disengagement of latches 95 from pins 97. The frame 52 is then moved from its unlatched to latched condition (FIG. 5) with the welding heads still in their raised position. The handle 112 is then rotated in a clockwise direction as seen in FIGS. 4 and 5 to move the welding heads to the welding position shown in FIG. 4. When the ferrule engaging portion of the chuck 88 engages the top surface of the beam, the latch 95 again engages pin 97 as seen in FIG. 4. The electrical circuit components are then activated, which serve to sequentially move the welding heads through their welding cycle to attach the welding studs to the top of the beam 11. The welding cycle is essentially that of raising the lower end of the welding stud from the top of the beam by means of the coil and armature while passing welding current between the studs and the beam to melt a portion of the lower end of the stud after which the stud is plunged into the molten pool which solidifies, attaching the stud to the top of the beam. After this has been accomplished, the handle 112 is rotated in a counterclockwise direction from the position of FIG. 4 to the position of FIG. 5, and thereafter to the position of FIG. 3 whereat new studs and ferrules are introduced into the machine prior to another welding cycle. The machine may then be moved to the left, for example viewing FIG. 1, by means of the handles 27 or by means of the knurled drive wheel 48 or both. As described hereinabove, when the machine reaches the extreme end 45 of the beam, studs can be welded thereon completely up to this point because of the construction of the carriage and the roller means carried by the mounting tubes.

It will be readily appreciated by those skilled in the art that the present machine may conveniently be adapted for use on wider beams by means of providing longer securing rods 22 or shorter rods when it is desired to accommodate narrower beams. The welding heads may also be conveniently shifted to different positions by means of the mounting blocks 69 carried on the guides 66 and 67. Additional welding heads may be added to the machine by utilizing longer guides and it will also be appreciated that some of the welding heads may be removed from the machine as presently shown. It will also be appreciated by those skilled in the art that the present machine may be used without moving the machine to the position shown in FIG. 3, but merely using the positions shown in FIGS. 4 and 5. This can be conveniently done by modifying the ferrule chuck slightly so that the ferrule with the end of the stud therein can be slid laterally underneath the stud chuck 103, for example see FIG. 5, and thereafter the stud may be raised vertically to be held by the chuck 103 while not disturbing materially the position of the welding end of the stud relative to the ferrule. The handle 112 may then be rotated clockwise to bring the device from the position of FIG. 5 into the position of FIG. 4 after which time the welding cycle would be initiated.

It will thus be seen that the present disclosure has described the preferred embodiment of a welding machine which is capable of economically welding weldable members such as studs to a beam or other convenient support member. This is done at a greater rate than that accomplished by prior art mechanisms and methods and as pointed out, the present machine accomplishes this by welding a plurality of the members in a sequential manner at substantially the same time and provision is made for accommodating surface irregularities in the top of the support member. After the welding has been accomplished, the stud chucks are moved vertically and a convenient means has been provided for holding the welding heads in welding position during the welding cycle and until an operator of the machine unlocks the same. The use of the three positions of the present machine as described in conjunction with FIGS. 3, 4 and 5 or simply FIGS. 4 and 5 also accomplishes the objects of the present invention.

Figure 7:
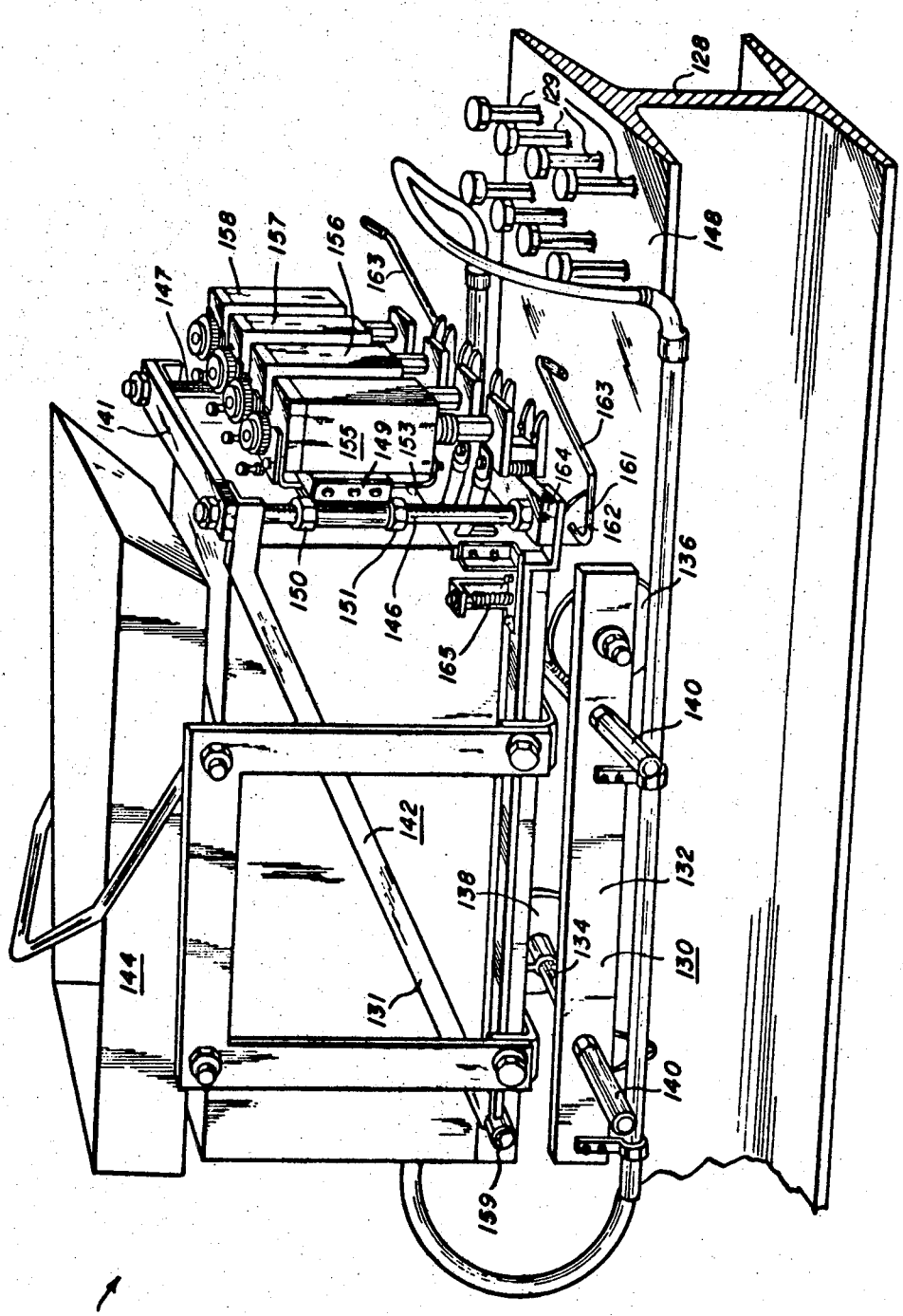
FIG. 7 is an isometric view showing the same invention as illustrated in FIGS. 1 through 5 but in a slightly modified form.
Figure 13:
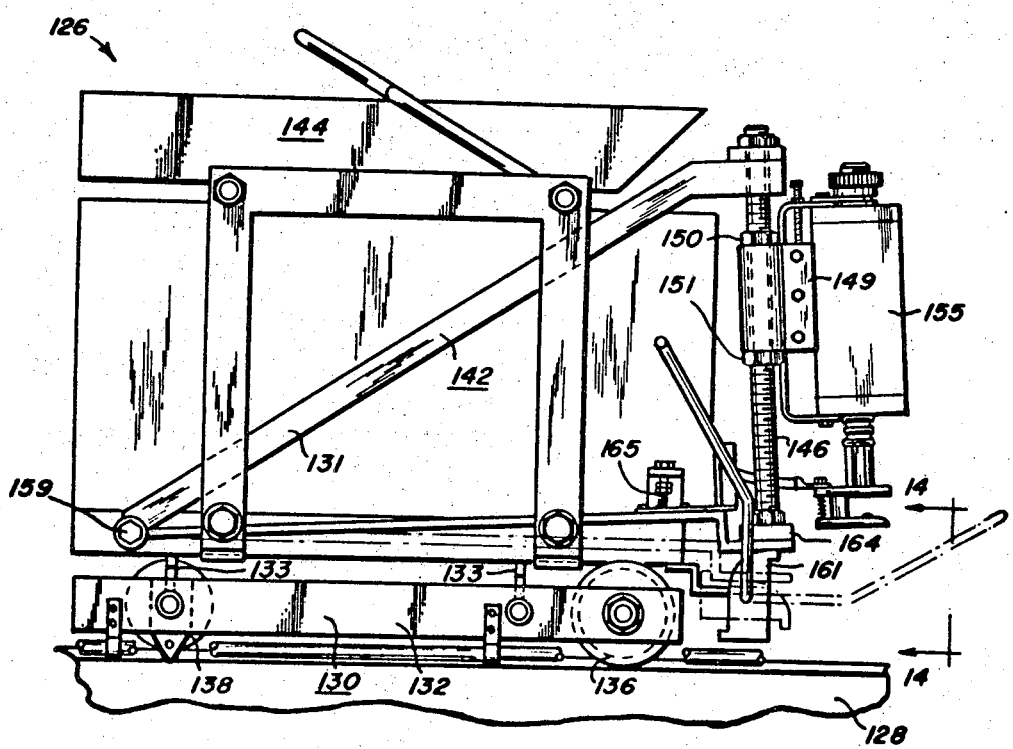
FIG. 13 is a side elevational view of the machine shown in FIG. 7 but with the parts in a different position.
Figure 14:
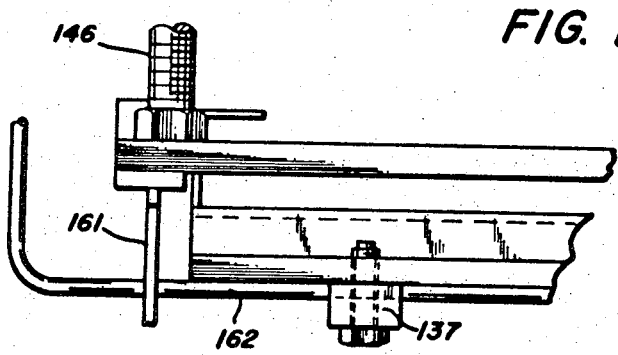
FIG. 14 is an enlarged fragmentary view taken generally along the line 14–14 of FIG. 13.
Figure 15:
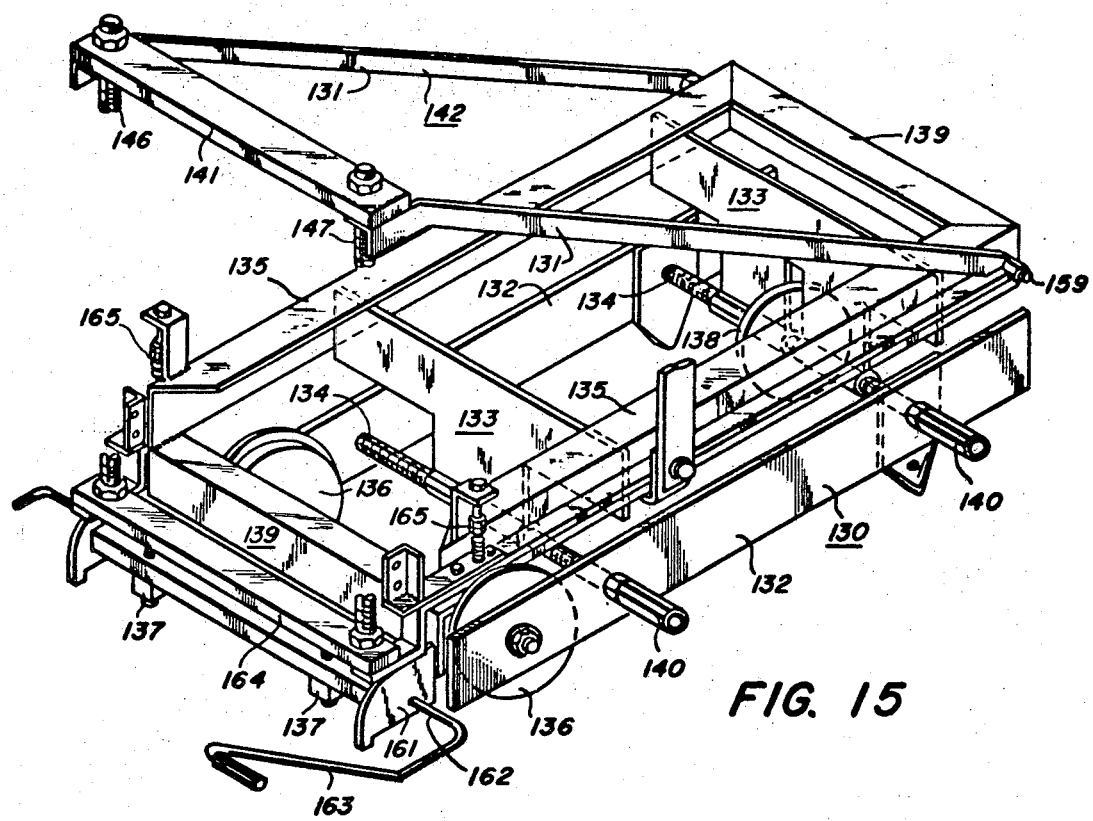
FIG. 15 is an isometric view of the machine of FIGS. 7 and 13 with parts broken away and with the parts in the position of FIG. 7.

The welding machine 126 illustrated in FIGS. 7, 13 and 15 serves to illustrate a slight modification in the structure shown in FIGS. 1 through 5 under the teachings of the same invention. The welding machine 126 has been shown located upon an I-beam 128 and is adapted to weld a plurality of weld studs 129 thereto. The welding machine 126 comprises a mounting platform or base 130 adjacent the upper surface of the beam 128 and this base includes side rails 132 held in fixed position relative to each other by cross rods 134. The rear rod 134 serves to mount a rear wheel 138 substantially midway between the side rails 132. This wheel 138 is adapted to travel upon the surface of the beam 128 to support the same. Connected to the front end portion of the side rails 132 are flanged front wheels 136 which also travel upon the outer edges of the beam 128 and support the front end of the platform or base 130. Handles 140 are provided on each of the cross rods for conveniently enabling operators of the machine to move the machine from beam to beam. The base 130 also includes two T-shaped crossrails 133 connected at their respective bottom portions to the rods 134 and at their top portions to channel members 135 which channel members are connected at their ends by channel members 139. The base is therefore a fixed unit which is capable of traveling along the top of a beam or other member on the wheels 136 and 138. A hopper or box 144 is carried by the base as shown and is for the purpose of carrying additional studs or other equipment.

A frame 142 is located directly above the base 130 and is adapted to be swingably carried thereby. The frame 142 includes members 131 connected at their right ends as seen in FIGS. 7 and 13 by a crossmember 141. The left ends of members 131 are pivotally connected to the base 130 by pivot means 159 which enable the entire frame 142 to be pivoted thereabout in a counterclockwise direction from the position shown in FIGS. 7 and 8 (referred to as the welding position) to a loading position shown in FIG. 13.

First and second vertically extending threaded members 146 and 147 form a part of the right end of the frame 142 as seen in FIGS. 7 and 13 and a mounting bar 149 is provided which extends between the threaded members 146 and 147 and which has a portion at either end which surrounds the threaded members. Nut members 150 and 151 are threadably located on each of the threaded members 146 and 147 and serve to determine the vertical position of the mounting bar 149. A plurality of welding heads, in this instance four in number, 155, 156, 157 and 158, are provided and are supported by means of the mounting bar 149. The particular mounting of each of the welding heads is accomplished by means of a U-shaped member 153 which is secured at the top of a welding head by means of a bolt 152 and extends around back of the mounting bar 149 and is secured at the bottom of the welding head by means of a bolt 154. This positions the welding head relative to the beam surface 148 in the welding position of the welding head which as discussed above, is shown in FIG. 8.

Figure 8:
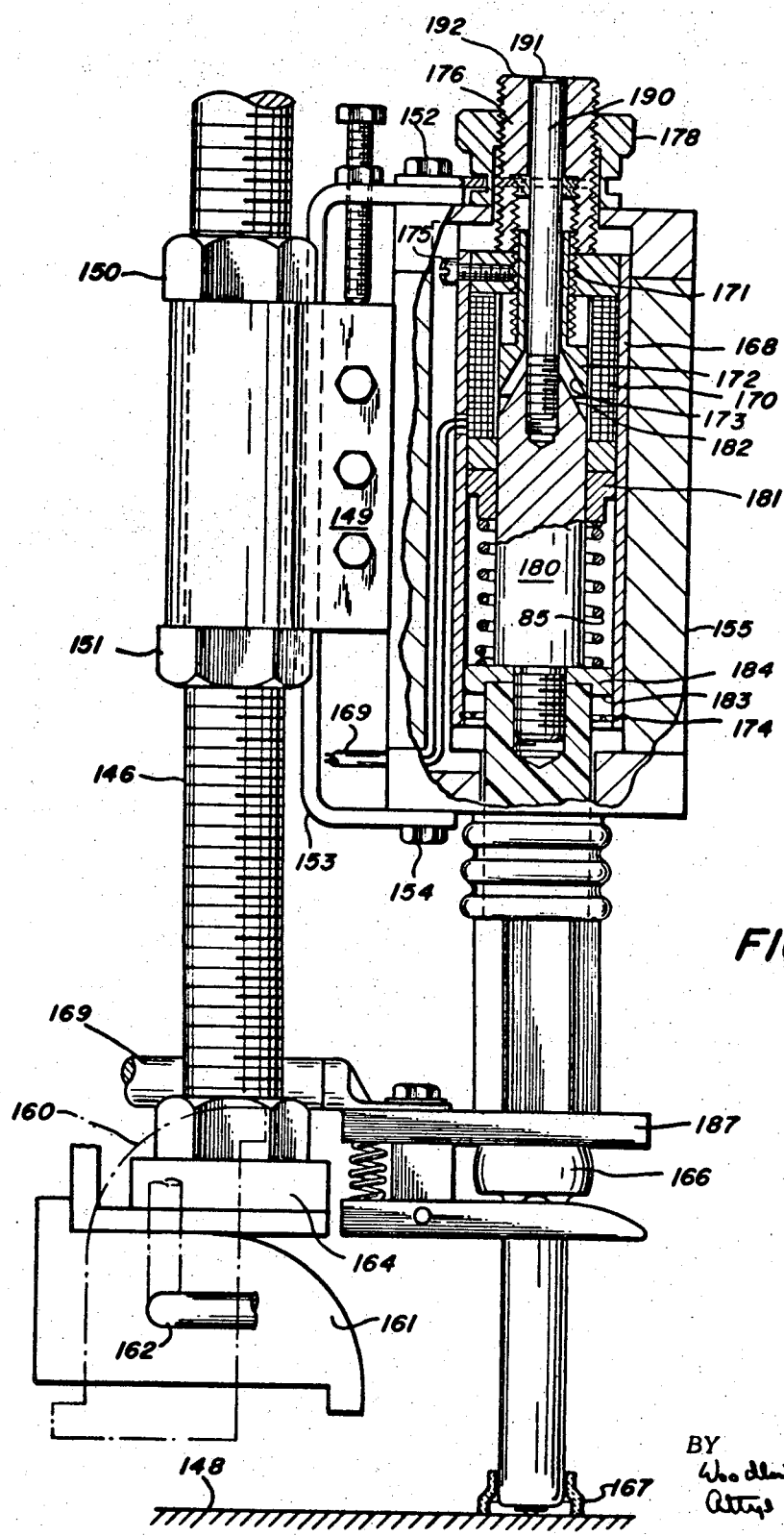
FIG. 8 is an enlarged elevational view of a portion of the device shown in FIG. 7 and showing a new and improved welding head in what will be referred to as the welding position.

A cam mechanism is provided for moving the frame 142 and the welding heads 155 through 158 which are carried thereon to the loading position. This is accomplished by means of a cam 161 carried by a pivot rod 162 which rod is connected to handles 163 which extend on either side of the beam and which may be manipulated by operators of the device. The full line position (FIG. 8) of the cam 161 locates the welding heads 155 through 158 in welding position and when the cam 161 is moved in a counterclockwise direction by means of the handles 163 and pivot rod 162, it moves to the dot-dash position 160. The cam and pivot rod 162 are rotatively supported by the mounting platform or base 130 by mounting members 137 and act on member 164 which extends between the lower ends of members 146 and 147 which serves to move the frame in a counterclockwise direction about the pivot means 159 as seen in FIGS. 7, 8 and 13. Spring biasing means 165 are provided which act between the mounting base 130 and the frame 142 and always exert a biasing action against the frame 142 to move it to the welding position shown in FIG. 8.

Electrical control apparatus is adapted to be contained and carried by the base 130 in the same manner as the housing of FIGS. 1 and 3, in order to properly provide electrical welding current to the weld heads as well as to control the movement of the armature which is contained in each of the welding heads and which will be described in greater detail hereinafter.

In order to operate the welding machine 126 shown and described in FIG. 7, the machine is moved by means of the wheels 136 and 138 to the desired position on the surface 148 of the beam 128. The handles 163 are moved in a counterclockwise direction as seen in FIG. 7 to move the frame 142 and the welding heads carried thereby to the loading position indicated by the dot-dash lines 160 in FIG. 8. When moved to this position the head 166 of a weld stud is inserted in the stud chuck 187 which forms a part of each of the welding heads and the lower end portion of the stud adjacent the surface 148 is inserted into a ferrule 167. The handle 163 is then moved in a clockwise direction to bring the various components into the position shown in FIG. 8 and the electrical circuit components are properly actuated which causes the stud welding operation to be performed. The stud welding operation, as is well known to those skilled in the art, involves the process of lifting the end of the stud adjacent the surface 148 slightly above the surface 148 while initiating an electric arc thereacross and thereafter weld current is impressed through conductor 169 which is connected to chuck 187, for a given period of time which serves to melt a portion of the end of the stud and a portion of the adjacent surface 148. After this the weld current is shut off and the welding head serves to push the melted end surface of the stud into the melted portion of the surface 148 thereby resulting in a welded junction. After the welding operation has been performed the machine 126 is moved to the next position and the welding operation is repeated. The pivotal movement of the frame 142 is essentially the same as the pivotal movement of the frame 52 in FIG. 3.

Figure 12:
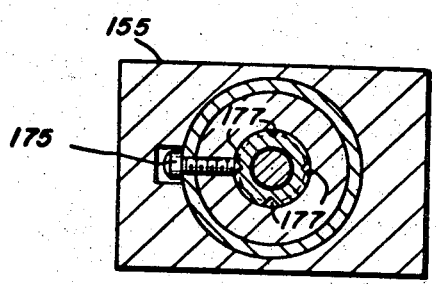
FIG. 12 is a view taken generally along the line 12–12 of FIG. 9.

The present invention provides a very important improvement for insuring the proper positioning of the components of the welding heads 155—158 and as a result the weld studs relative to the surface 148 to which the stud is to be welded particularly in the case where the surface 148 deviates from the norm, for example in a raised spot or in a depressed surface. The important improvement will be described hereinafter and in order to accomplish the same the following structure is provided. Each of the welding heads 155 through 158 include the same structure and as a result only the details regarding welding head 155 will be described. The welding head 155 provides the normal hollow enclosure or housing and located within this housing is an annular shell or mounting member 168. Connected to this shell and forming a part thereof and adapted for movement therewith is an electrical coil 170 which is adapted to be energized through two conductors 169. Also connected to the shell 168 by means of a threaded connection as at 171 is a lift or upper abutment member 172 which includes a tapered or conical surface 173. A plunge or lower abutment member 174 is provided on the lower inner surface of the annular shell 168 and in this particular embodiment assumes the form of a snap ring. A screw 175 locates the upper abutment member 172 in the proper position relative to the annular shell 168 by means of the end of the screw 175 being located in an appropriate one of four notches 177 which are shown in FIG. 12. A threaded member 176 extends through an opening in the upper end of the welding head 155 and extends therefrom and forms a part of or is connected to the upper end of the shell 168 by means of the screw 175 as shown. A threaded nut 178 threadably engages the threaded member 176 and when turned, moves the entire shell 168 along with the upper abutment 172, the coil 170, and the lower abutment 174 between upper and lower limits. Positioned within the shell and the coil is an armature 180 which has an upper stop 182 in the form of a tapered surface conforming to surface 173 and a lower stop 183. The armature 180 is adapted to move upwardly so as to engage surface 182 with surface 173 upon energization of the coil 170 through conductors 169. A spring 185 acts between the annular shell 168 and the armature by way of members 181 and 184, to constantly urge the armature in a direction so as to engage the lower stop 183 with the lower abutment 174. The stud chuck 187 is connected to the armature by way of members 186 and 189, and the chuck 187 will not be described in further detail except to state that it is of the same construction as that disclosed U.S. Pat. No. 3,252,709 issued May 24, 1966 entitled Stud Chuck. An indicator rod 190 is threadably secured at its lower end to the armature 180 as seen for example in FIGS. 8, 9 and 10 and its upper end extends through an opening in threaded member 176 with the upper surface 191 thereof being close to the upper surface 192 of threaded member 176.

As mentioned hereinabove, the welding head 155 is shown in FIG. 8 in what has been referred to as the welding position which is the position which properly physically locates the studs and the various components which make up the welding head just prior to energization of the coil 170 and the passage of weld current between the end of the stud and the surface to which the stud is to be welded. In this particular position it will be noted that the lower stop 183 is raised a given distance above the lower abutment 174 because the stud has been pushed into engagement with the surface 148 thereby raising the armature 180 against the biasing of spring 185. This distance is commonly referred to in the art as the "plunge" distance. In this particular position of the elements it will be noted that the upper stop 182 is spaced a given distance from the tapered surface 173 which forms a part of the upper abutment 172. Upon energization of the coil 170 the armature will be raised this given distance commonly referred to in the art as the "lift" distance. For the sake of describing the present invention it has been assumed for the present welding conditions which includes the size of the stud, the weld current etc., that the plunge distance and the lift distance are equal, to accomplish the most ideal weld junction between the end of the stud and the surface 148. When the components are in this described ideal position, it will be noted that the armature assumes a particular position and since the indicator rod 190 is connected to the armature, the upper surface 191 has been predetermined to coincide with the upper surface 192, or in other words to be planar therewith.

FIG. 9 has been shown to demonstrate the advantages of this structure when the welding head is located above a depressed part of the surface 148 of the beam. It will be noted with the end of the stud in engagement with the depressed portion of the surface of the beam that this permits the stud as well as the armature 180 to be located in a lower position relative to the coil 170 and the shell 168 and this positioning is made apparent to an operator of the device because under these conditions the upper surface 191 of the indicator rod 190 is located below the upper surface 192 of the threaded member 176. If the welding operation were to be initiated under these circumstances, it would quite probably result in the stud being lifted too high above the depressed part of the surface 148 of the beam increasing the resistance to flow of electric weld current between the tip of the stud and the surface 148 because of the increase in the distance thereby providing improper heat to perform the welding operation. Additionally the plunge distance which is determined by the spacing between elements 174 and 183 would be too small and of course the "plunge" is the distance the spring 185 moves the molten end of the stud into the molten surface 148 of the beam.

To correct this condition which is shown and has been described in conjunction with FIG. 9, it is necessary to turn the threaded nut 178 in the proper direction to move the threaded member 176 and as a result the annular shell 168, coil 170, upper abutment 172, and lower abutment 174 downwardly so as to bring the upper surface 191 of the indicator rod into flat relationship with the upper surface 192 of threaded member 176. This is shown in FIG. 10.

This positioning results in the upper and lower abutments 172 and 174 being placed in the same relationship with the respect to the upper and lower stops 182 and 183 as is shown in FIG. 8, however, as noted, the annular shell and its connected elements is actually located lower within the welding head 155. This permits the armature 180 to "lift" the proper distance when the coil 170 is energized and to "plunge" the proper distance under the urging of spring 185 after the coil 170 has been deenergized.

It will be apparent to those skilled in the art that the present invention relating to proper location of the elements of the welding head just hereinabove described is equally applicable to the structure commonly referred to as hand guns by those skilled in the art. It will also be readily appreciated by those skilled in the art that the precise position in which the elements of the welding head are shown in FIG. 8 will be different under different welding conditions, for example, different size studs, different welding currents, etc., and these positions may always be predetermined. It will also be appreciated by those skilled in the art after reviewing the above disclosure that for the purposes of describing this embodiment it has been assumed that proper welding conditions are best observed by having the surfaces 191 and 192 flat with respect to each other, however, it will be obvious that one might predetermine that the precise and ideal welding conditions occurred when the indicator rod was either slightly above or slightly below the indicator surface 192 of the member 176. It will be apparent that should the welding head be located above a raised spot on the beam that the reverse procedure would be utilized, namely that of raising the shell along with the connected upper and lower abutments.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. A welding machine for welding a plurality of studs transversely across a beam including in combination a mounting platform disposed generally parallel to the beam, first and second mounting tubes positioned on either side of said mounting platform and extending generally lengthwise of the beam, first and second securing rods connecting said mounting tubes together, an intermediate portion of said rods being connected to said mounting platform to support the same, a plurality of spaced vertical pivot means mounted by said first and second mounting tubes, a roller mounted by each of said vertical pivot means with each said roller engageable with said beam, a drive wheel, pivot means mounting said drive wheel to one of said mounting tubes for engagement with the top of the beam, a frame having first and second end portions, pivot means pivotally connecting said second end portion of said frame to said mounting platform for movement of said frame between first and second positions, latch means carried by said mounting platform and engageable with said frame to maintain same in said first position, counterweight means connected to said second end portion of said frame to aid in maintaining said frame in said second position upon disengagement of said latch means, first and second guides extending generally horizontally to said frame, a plurality of mounting blocks each having guideways interfitting with said guides to secure said mounting blocks thereto, a welding head connected to each of said mounting blocks for movement between first and second vertical positions relative thereto, a vertical opening through each said mounting block, a guide rod extending through each of said vertical openings, said guide rods being secured at their upper portions to an upper portion of a respective welding head and at their lower portions to a lower portion of a respective welding head, each said welding head comprising a leg terminating short of the top of the beam, a ferrule chuck secured to each leg, a movable armature in each welding head surrounded by a coil adapted to be energized to move said armature, a stud chuck connected to each armature for movement therewith, a lifting pin secured to the upper portion of each said welding head, a rod journaled for angular movement and carried by said mounting blocks, a variable lowering device for each welding head, each lowering device including an operating member secured to said rod, said member having a guide chamber, an engagement member in said guide chamber and having a portion extending therefrom and engaging the upper portion of a welding head, a spring in said guide chamber exerting a force on said engagement member to urge same into contact with said welding head, a lifting member carried by an operating member and being angularly movable relative thereto, said lifting member engageable with said lifting pin, an engagement pin carried by said operating member to engage said lifting member to raise said welding heads upon rotation of said rod in a given direction, a housing carried by said second end portion of said mounting platform for carrying electrical circuit components for controlling the welding cycle of said welding heads, and electrical conductor means extending from said housing to said stud chucks and said coils for supplying electrical energy thereto.

2. A welding machine for welding a plurality of studs transversely across a beam including in combination a mounting frame, a plurality of mounting blocks connected said frame, a welding head connected to each of said mounting blocks for movement between first and second vertical positions relative thereto, a vertical opening through each said mounting block, a guide rod extending through each of said vertical openings, said guide rods being secured at their upper portions to an upper portion of a respective welding head and at their lower portions to a lower portion of a respective welding head, each said welding head comprising an extendible leg, a ferrule chuck secured to each extendible leg, a movable armature in each welding head surrounded by a coil adapted to be energized to move said armature, a stud chuck connected to each armature for movement therewith, a lifting pin secured to the upper portion of each said welding head, a rod journaled for angular movement and carried by said mounting blocks, a variable lowering device for each welding head, each lowering device including an operating member secured to said rod, said operating member having a guide chamber, an engagement member in said guide chamber and having a portion extending therefrom and engaging the upper portion of a welding head, a spring in said guide chamber exerting a force on said engagement member to urge same into contact with said welding head, a lifting member having an end and carried by said operating member and being angularly movable relative thereto, said end of said lifting member engageable with said lifting pin, an engagement pin carried by said operating member to engage said end of said lifting member to raise said welding heads upon rotation of said rod in a given direction.

3. A welding machine for welding a plurality of studs transversely across a beam including in combination a mounting frame, a plurality of mounting blocks fixedly connected to said frame, a welding head connected to each of said mounting blocks for straight line movement between first and second vertical positions relative to said mounting blocks, guide means acting between said mounting blocks and welding heads for guiding and controlling said straight line movement, each of said welding heads comprising a movable armature surrounded by a coil which is adapted to be electrically energized to move said armature, a stud chuck connected to each armature for straight line movement therewith between first and second vertical positions relative to said welding head, a lever member, cam means acting between said lever member and said welding heads whereby upon actuation of said lever member said welding heads are moved in said straight line movement between said first and second vertical positions, pivot means pivotally mounting said frame at a position removed from said mounting blocks whereby said frame may be swung between a loading position and a welding position, and latch means for securing said mounting frame in a welding position and in the unlatched condition permitting the mounting frame to be moved to said loading position.

4. A welding machine for welding a plurality of studs including in combination a mounting frame, a plurality of mounting blocks connected to said frame, a welding head connected to each of said mounting blocks for straight line movement between first and second vertical positions relative to said mounting blocks, guide means acting between said mounting blocks and welding heads for guiding and controlling said straight line movement, each of said welding heads comprising a movable armature surrounded by a coil which is adapted to be electrically energized to move said armature, a stud chuck connected to each armature for straight line movement therewith between first and second vertical positions relative to said welding head, a lever member, and cam means acting between said lever member and said welding heads whereby upon actuation of said lever member said welding heads are moved in said straight line movement between said first and second vertical positions.

5. A welding machine for welding a plurality of studs including in combination a mounting frame, a plurality of mounting blocks connected to said frame, a welding head connected to each of said mounting blocks for straight line movement between first and second vertical positions relative to said mounting blocks, guide means acting between said mounting blocks and welding heads for guiding and controlling said straight line movement, each of said welding heads comprising a movable armature surrounded by a coil which is adapted to be electrically energized to move said armature, a stud chuck connected to each armature for straight line movement therewith between first and second vertical positions relative to said welding head, a lever member, and means acting between said lever member and said welding heads whereby upon actuation of said lever member said welding heads are moved in said straight line movement between said first and second vertical positions.

6. A welding machine for welding a plurality of studs onto a member including in combination a base, a mounting frame, a plurality of welding heads fixedly connected to said frame, each of said welding heads comprising a movable armature surrounded by a coil which is adapted to be electrically energized to move said armature, a stud chuck connected to each armature for straight line movement therewith between first and second vertical positions relative to said welding head, pivot means pivotally connecting an end portion of said frame opposite said welding heads to said base, lever means operably connected to said frame whereby upon movement of said lever member said frame is moved about said pivot means in one direction and said welding heads are moved from a first to a second vertical position.

7. A welding machine for welding a plurality of studs to a structural beam in a predetermined pattern, said machine including a frame, front and rear wheels engageable with the beam for supporting said frame above the beam, a plurality of welding tools each comprising a chuck for receiving a stud, means for moving the chuck away from the beam, means for plunging the chuck toward the beam, and means for supplying electrical power to said chuck, means for supporting said welding tools on said frame for vertical movement, and transverse movement relative to said frame, guide members extending outwardly from each side of said frame and adapted to engage edges of the beam, and means for raising said tools and said supporting means as a unit relative to the front wheels of said machine.

8. A welding machine for welding a plurality of studs to a structural beam in a predetermined pattern, said machine including a frame, front and rear wheels engageable with the beam for supporting said frame above the beam, a plurality of welding tools each comprising a chuck for receiving a stud, means for moving the chuck away from the beam, means for plunging the chuck toward the beam, and means for supplying electrical power to said chuck, means for supporting said welding tools on said frame for movement relative to said frame, guide members extending outwardly from each side of said frame and adapted to engage edges of the beam, and means for raising said tools and said supporting means as a unit relative to the front wheels of said machine.